(12) United States Patent
Johnson et al.

(10) Patent No.: US 7,381,582 B2
(45) Date of Patent: Jun. 3, 2008

(54) METHOD AND STRUCTURE OF ION IMPLANTED ELEMENTS FOR THE OPTIMIZATION OF RESISTANCE

(75) Inventors: Russell L. Johnson, New Brighton, MN (US); Curtis H. Rahn, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 268 days.

(21) Appl. No.: 11/263,464

(22) Filed: Oct. 31, 2005

(65) Prior Publication Data

US 2007/0111355 A1    May 17, 2007

(51) Int. Cl.
*H01L 21/00* (2006.01)
(52) U.S. Cl. .................. 438/48; 438/50; 438/51; 257/414; 257/E27.024
(58) Field of Classification Search .......... 438/48, 438/50, 51, 53; 257/414, E27.024
See application file for complete search history.

(56) References Cited

U.S. PATENT DOCUMENTS 6,263,740 B1 * 7/2001 Sridhar et al. ............... 73/754
6,912,759 B2 * 7/2005 Izadnegahdar et al. .... 29/25.35
6,933,582 B2 * 8/2005 Ishio et al. ................. 257/419

* cited by examiner

*Primary Examiner*—Hsien-ming Lee
(74) *Attorney, Agent, or Firm*—McDonnell Boehnen Hulbert & Berghoff LLP

(57) ABSTRACT

A method of forming a piezo-resistive sensor, comprising a piezo-resistor, a leadout resistor, and an insulator structure is provided. A Silicon-On-Insulator (SOI) substrate is provided having an epitaxial layer, a dielectric layer, and a bulk substrate layer. A mask layer is formed on top of the epitaxial layer. The mask layer defines where the piezo-resistor and leadout resistors are to be located by creating first exposed portions of the epitaxial layer. A silicon dioxide layer ($SiO_2$) is grown in a Local Oxidation of Silicon (LOCOS) process for a predetermined time on the first exposed portions based on the desired thickness of the piezo-resistor, where the-piezo resistor is located below the $SiO_2$ layer. The thickness of the leadout resistor, and therefore the parasitic leadout resistance, is determined by the original thickness of the epitaxial layer and can be maintained independent of the piezo-resistor thickness.

15 Claims, 4 Drawing Sheets

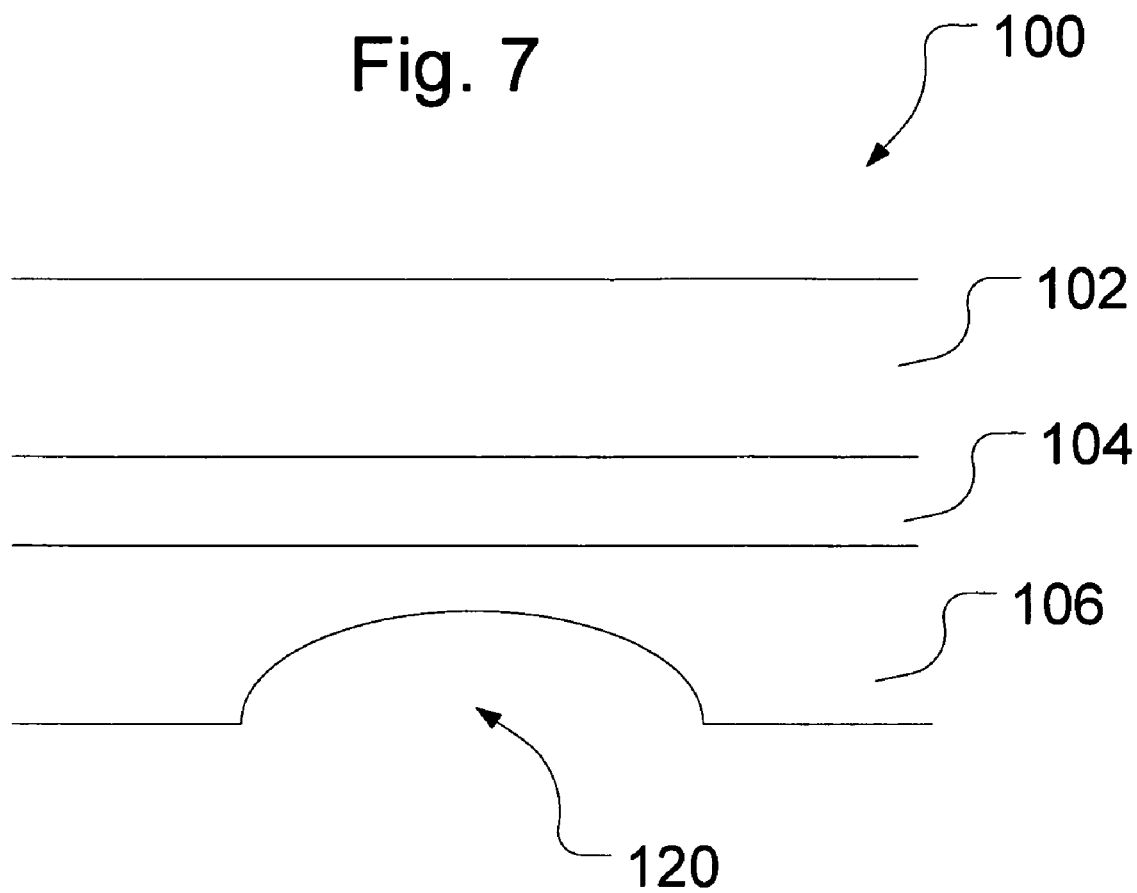

US 7,381,582 B2

METHOD AND STRUCTURE OF ION IMPLANTED ELEMENTS FOR THE OPTIMIZATION OF RESISTANCE

FIELD

The present invention relates generally to the fabrication of a piezo-resistive sensor and insulator structure, and more particularly, relates to a favorable method of forming a piezo-resistor and insulator structure with leadout interconnects, where the piezo-resistor can be customized in thickness for the purpose of optimizing performance, and where the thickness of the leadout interconnect structure is determined only by the original starting thickness and can be maintained during fabrication, thus minimizing parasitic resistances.

BACKGROUND

Silicon-On-Insulator (SOI) based technology allows a micro-electronic or Micro-Electro-Mechanical (MEMs) device to be fabricated in a silicon layer that is located above an insulating layer (e.g. a buried oxide layer). The insulating layer is located over a silicon substrate. Electronic devices, such as a transistor as well as MEMs type devices are fabricated in the layer of silicon located on top of the insulating layer. This technique may provide higher speeds and use less power by reducing capacitance, reducing or eliminating the reverse leakage of the p-n junctions and thus making device operation in SOI superior to devices fabricated in conventional Complementary Metal-Oxide Semiconductor (CMOS) bulk silicon based processing.

One type of structure that may be implemented in SOI is a pressure sensor. Pressure sensors include a piezo-resistor coupled with a diaphragm. The piezo-resistor is embedded in the diaphragm, and responds to a change in stress of the diaphragm with a change in resistance as a consequence of the piezo-resistive effect. When the pressure applied to the diaphragm changes, the amount of deflection of the diaphragm changes accordingly, which results in a change in the stress level in the silicon diaphragm. This in turn causes the piezo-resistor element to increase or decrease in resistance. Thus, the increase or decrease in resistance may be used to gauge the amount of pressure being applied to the diaphragm.

In present piezo-resistive based pressure sensors, a voltage or current source is coupled to the piezo-resistor via a leadout resistance. Unfortunately, this leadout resistance decreases the sensitivity of the pressure sensor by increasing the overall resistance of the pressure sensor. A current or voltage signal applied to the piezo-resistor must also be applied the leadout resistance. Because the leadout resistance is in series with the piezo-resistor, a portion of the current or voltage signal is distributed across the leadout resistance. The larger the leadout resistance, the larger the portion of the signal distributed across the leadout resistance. Current processes do not provide a means to tailor the thickness of the piezo-resistor independently of the leadout resistor such that the leadout portion of the overall resistance of the pressure sensor is adjustable in relation to the resistance of the piezo-resistor, thereby allowing the sensitivity of the pressure sensor to be increased or decreased without degrading the overall performance of the sensor.

The techniques and structures disclosed herein are believed to improve upon these prior attempts.

SUMMARY

The present application allows the piezo-resistor and the leadout interconnect to be optimized in thickness independently of each other for optimization of overall performance. The present application describes a method of fabricating a piezo resistor and insulator structure, the method comprising providing a Silicon-On-Insulator (SOI) substrate, the SOI substrate comprising an epitaxial layer located on top of a dielectric layer, and the dielectric layer located on top of a bulk substrate layer, forming a mask layer on top of the epitaxial layer, the mask layer defining where the resistor and insulator structure are to be located by creating first exposed portions of the epitaxial layer, and growing a silicon dioxide layer ($SiO_2$) in a Local Oxidation of Silicon (LOCOS) process for a predetermined time on the first exposed portions of the epitaxial layer based on a desired thickness value of the piezo-resistor, the piezo-resistor being located below the $SiO_2$ layer.

The present application further describes a piezo-resistive sensor structure comprising a piezo-resistor including a first portion of an epitaxial layer, the resistance value of the piezo-resistor being derived in a Local Oxidation of Silicon (LOCOS) process, and a leadout resistor comprising a second portion of the epitaxial layer, the leadout resistor being electrically coupled to the piezo-resistor, thereby providing a low resistance interconnect between the piezo-resistor and a metal contact. The resistance value of the piezo and leadout resistors establish the overall resistance of the piezo-resistive sensor.

BRIEF DESCRIPTION OF THE DRAWINGS

Presently preferred embodiments are described below in conjunction with the appended drawing figures, wherein like reference numerals refer to like elements in the various figures, and wherein:

FIG. 7 is a cross sectional view of the substrate of FIG. 1 including a cavity.

DETAILED DESCRIPTION

Figure 1:
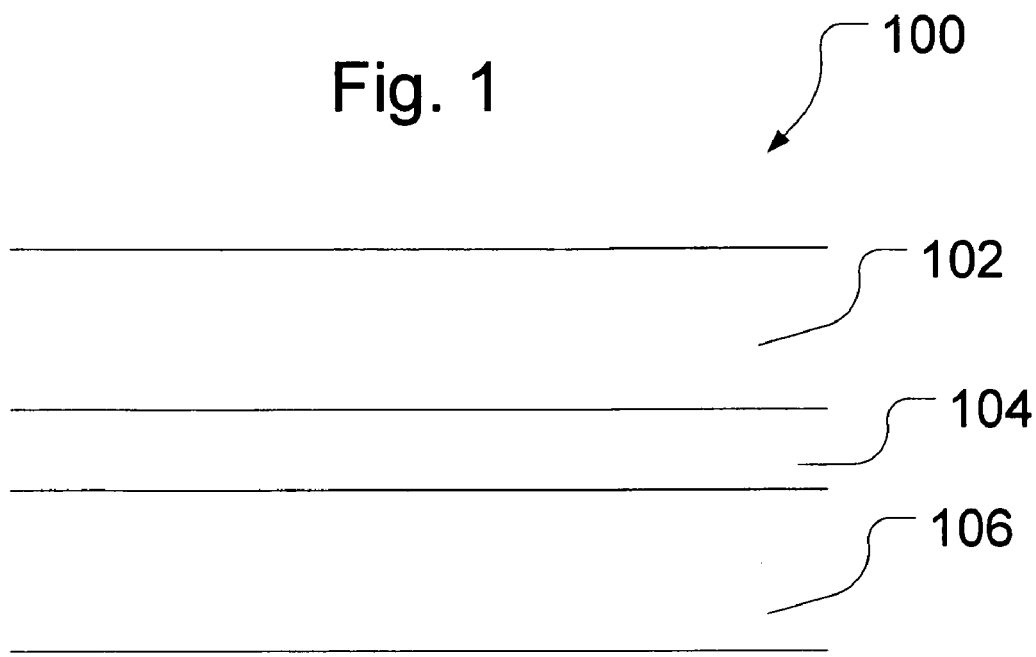
FIG. 1 is a cross sectional view of an SOI substrate.

A structure and method of fabricating a piezo-resistor and insulator structure are presented. The piezo-resistor structure may be used in an electromechanical pressure sensor, for example. Turning now to FIG. 1, a Silicon-On-Insulator (SOI) substrate 100 is illustrated. The substrate 100 includes an epitaxial layer 102, which may be n-type or p-type silicon, a dielectric layer 104, which may be silicon-dioxide ($SiO_2$), and a substrate layer 106, which may be n-type, p-type, or bulk silicon. The epitaxial layer 102 may also have a dopant concentration that is used to establish the resistivity of a piezo-resistor. The dopant concentration may directly determine the resistivity of the piezo-resistor, or it may be subsequently doped at an implant step. One such implant step is further described with reference to FIG. 5. Although the substrate layer 106 is shown as a single layer, additional layers may be included. Substrate layer 106, for example, may include an "etch stop" n-type silicon layer over a layer of p++-type silicon. In addition, a cavity may also be electro-mechanically etched into the substrate layer 106 where the "etch stop" layer is used to control the stop of the etch and hence, the thickness of the silicon diaphragm. The cavity may serve to form a diaphragm for a pressure sensor. Alternatively, the cavity may be fabricated at a subsequent step. The inclusion of a cavity will be further described with reference to FIG. 7.

Figure 2:
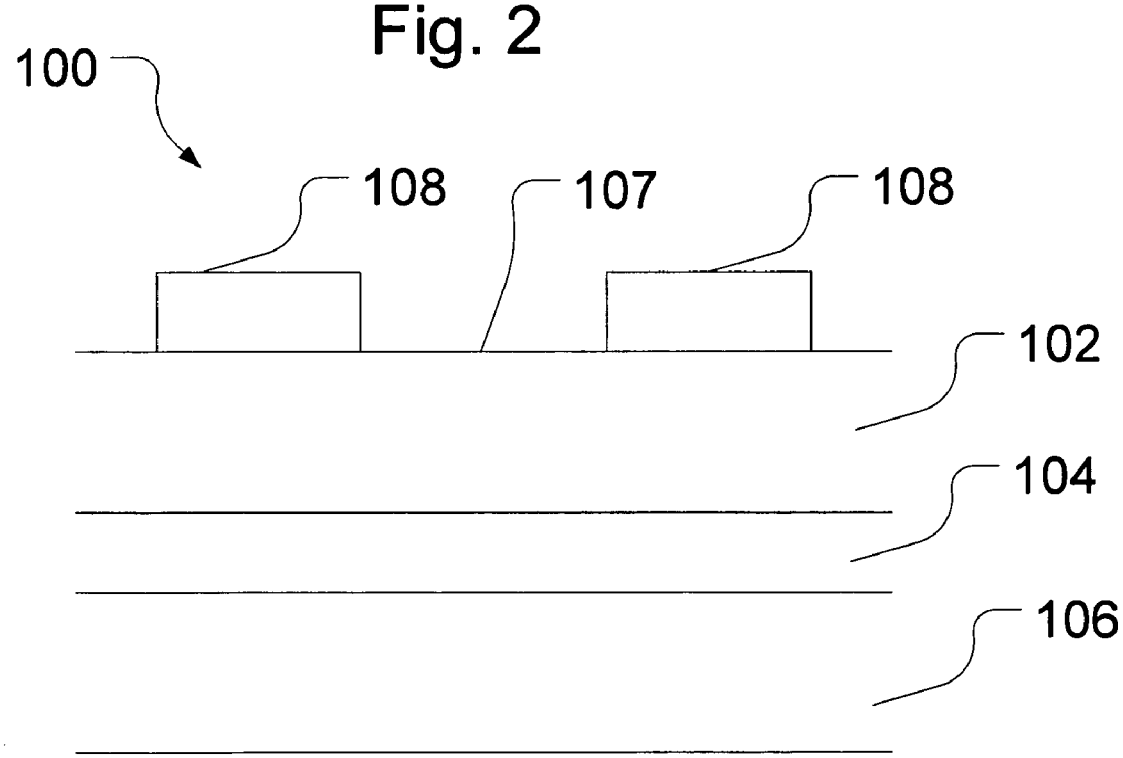
FIG. 2 is a cross sectional view of the formation of a mask layer on the substrate of FIG. 1.

FIG. 2 shows a mask 108 formed on top of the epitaxial layer 102. The mask 108 may be silicon nitride ($Si_3N_4$), for example. Forming the mask 108 may include depositing a mask layer (such as a $Si_3N_4$) and patterning the mask layer so as to define the mask 108. The mask 108 may be patterned by a conventional photolithography and etching process. The mask 108 includes two "islands" which are located on top of the epitaxial layer 102. These islands are used to define where the piezo-resistor and leadout resistors are to be located. The mask 108, in operation, inhibits oxidation in the areas of the epitaxial layer 102 that it covers. In the un-covered areas of the epitaxial layer 102 that are in close proximity to the mask 108, the rate of oxidation may be reduced in relation to the oxidation rate of uncovered areas that are not in close proximity to the mask 108.

Figure 3:
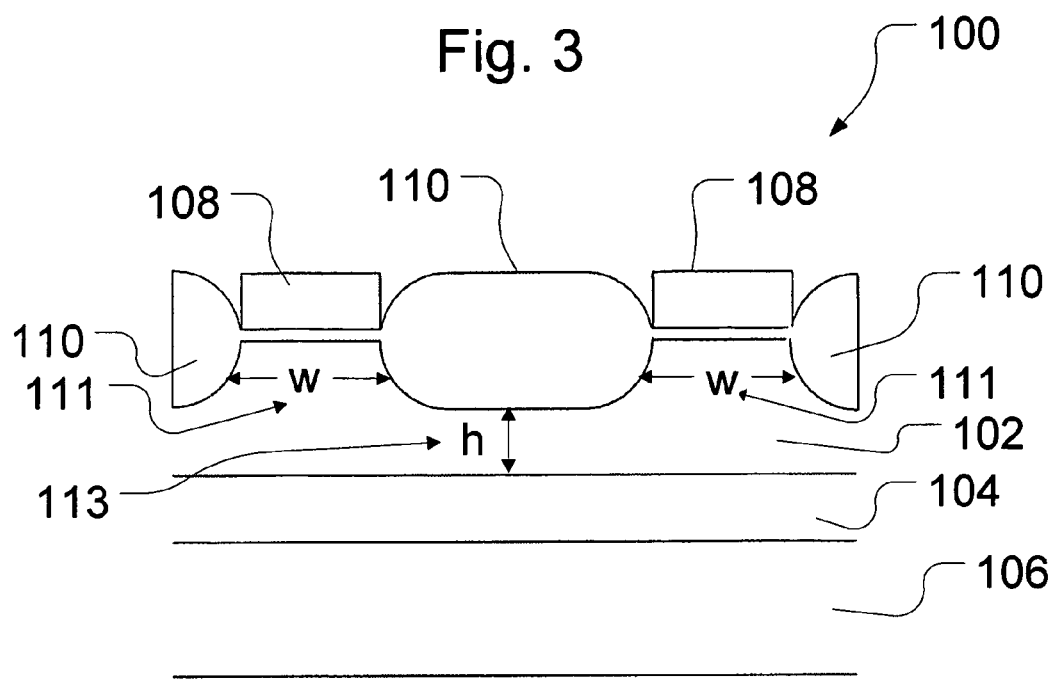
FIG. 3 is a cross sectional view of the growth of a silicon dioxide layer during a LOCOS process.

In FIG. 3, the SOI substrate 100 has undergone a Local Oxidation of Silicon (LOCOS) process. LOCOS is an isolation scheme commonly used in MOS/CMOS silicon technology. LOCOS is used to thermally grow thick pads of silicon dioxide which are used to separate adjacent devices (e.g. such as PMOS and NMOS FETs). As described above, the uncovered areas of the mask 108 (such as first exposed portion 107 in FIG. 2) are locally oxidized, hence, "local" oxidation. After the LOCOS step, the mask 108 may be removed by a conventional etching process, such as "dry" or "wet" chemical etch.

During the LOCOS step, silicon reacts with oxygen at a high temperature. Thus, as shown in FIG. 3, a layer of silicon dioxide 110 is grown on the first exposed portion 107 of the epitaxial layer 102. Because the growth rate of the silicon dioxide is reduced in the uncovered areas in close proximity to the mask 108, the epitaxial layer 102 is not oxidized as quickly in the areas of close proximity to the mask 108. Therefore, a reduced silicon dioxide thickness is produced in those areas. As a result, the layer of silicon dioxide 110 in close proximity to the mask 108 will have a curved or graded profile, commonly referred to as a "bird's beak".

It is in the LOCOS step that the height 113 of the piezo-resistor may be adjusted while maintaining the thickness of the leadout resistor. By increasing the LOCOS time, the height 113 may be decreased. Alternatively, the height 113 may be increased by decreasing the LOCOS time. Thus, the thickness of the piezo-resistor can be adjusted by subjecting the substrate 110 to LOCOS for a predetermined time, which has no little or no affect on the thickness of the leadout resistor. Accordingly, optimum performance of the sensor can be achieved by determining the original thickness of the substrate and then determining the time of the LOCOS step.

Figure 4:
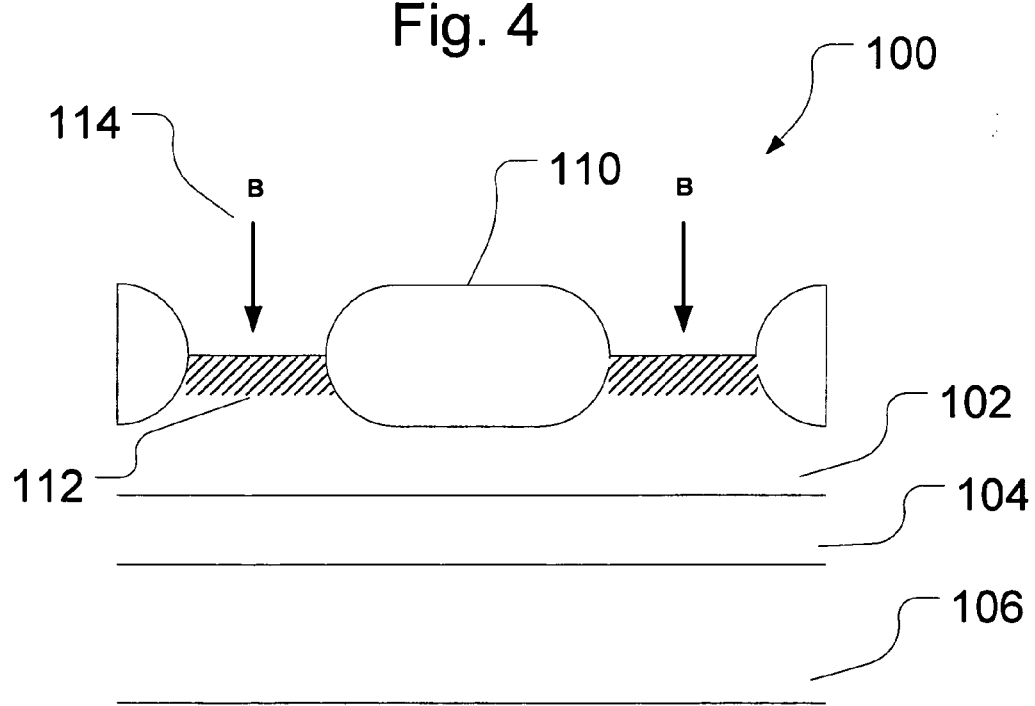
FIG. 4 is a cross sectional view of the removal of the mask layer.
Figure 6:
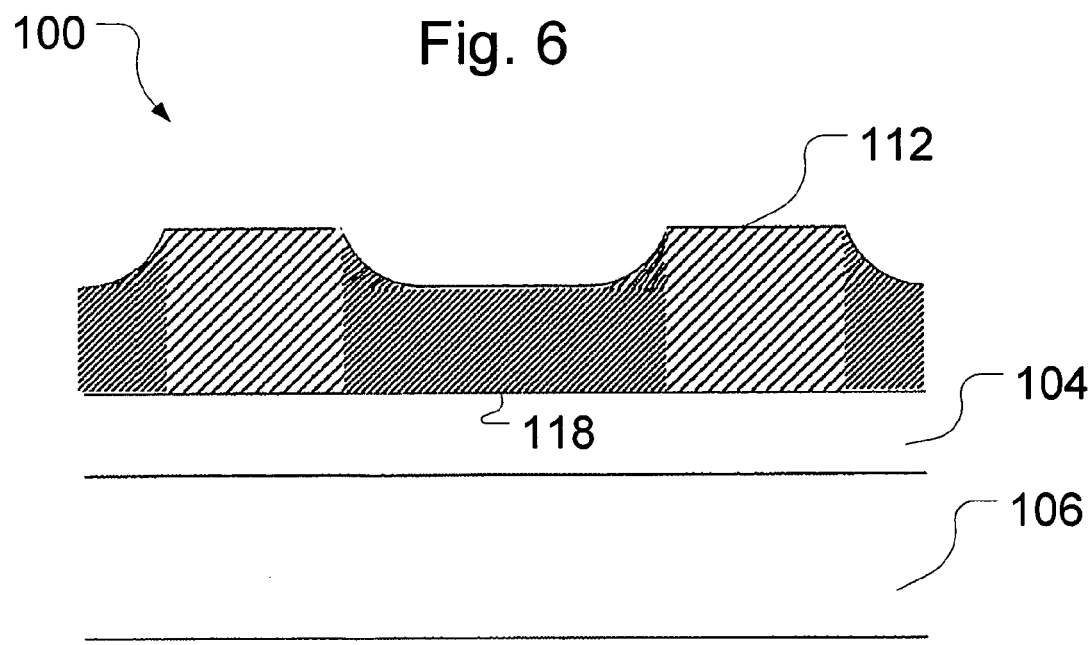
FIG. 6 is a cross sectional view of the implant being diffused into the buried oxide layer.

Referring to FIG. 4, the mask layer is removed, creating a second exposed portion 112 of the epitaxial layer 102. The second exposed portion 112 is located in the areas in which the mask 108 was located prior to it being removed. A dopant 114, such as boron (if the epitaxial layer is n-type), is then implanted into the second exposed portion 112. As shown in FIG. 6, the dopant species 114 is then diffused by being driven down to the dielectric layer 104 to form leadout resistor 112 to the piezo-resistor 118. The dopant concentration of the leadout resistor 112 may be designed so as to reduce the parasitic resistance to provide a low resistivity ohmic contact of the leadout resistor 112 to the metal interconnect, while minimizing temperature effects.

Figure 5:
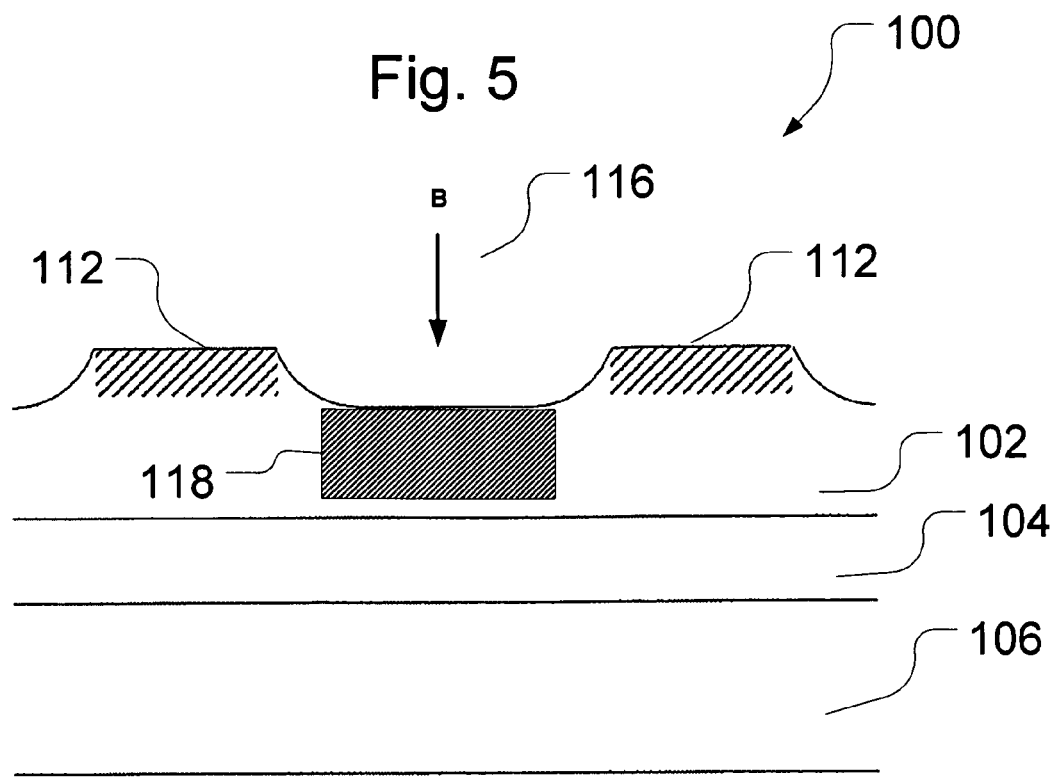
FIG. 5 is a cross sectional view of the substrate of FIG. 4 undergoing implantation for the formation of a piezo-resistor.

FIG. 5 depicts an alternative method of forming the piezo-resistor 118. By doping the area of the SOI substrate 100 in which the silicon dioxide 110 was formed, the resistance of the piezo-resistor may be tailored after the initial doping of the leadout resistances. The dopant of the piezo-resistor may be driven in the leadout resistance drive step. As described above, however, the epitaxial layer 102 as provided in FIG. 1 may itself define the resistivity of the piezo-resistor 118, in which case this step may not be necessary.

FIG. 7 illustrates a cavity 120 which may be formed in the bulk substrate layer 106. As described above, cavity 120 may be provided prior to, or subsequent the application of method 10. The cavity, in operation, may serve to form a diaphragm which allows the piezo-resistor 118 to vary with applied pressure. Because the epitaxial layer is crystalline in nature, a larger pressure applied to the diaphragm will deflect the diaphragm and change the resistance of the piezo-resistor 118. The cavity 120, may be designed to form diaphragms of higher aspect ratios so that the piezo-resistor is more sensitive to changes in applied pressure.

While certain features and embodiments of the present invention have been described in detail herein, it is to be understood that other variations may be made without departing from the intended scope of the invention. For example, a variety of semiconductor fabrication techniques, including various methods of etching and deposition, may be employed without departing from the scope of the invention itself. The claims should not be read as limited to the described order or elements unless stated to that effect. Therefore, all embodiments that come within the scope and spirit of the following claims and equivalents thereto are claimed as the invention.

We claim:

1. A method of fabricating a piezo-resistive sensor and insulator structure, the method comprising:
    providing a Silicon-On-Insulator (SOI) substrate, the SOI substrate comprising an epitaxial layer located on top of a dielectric layer, and the dielectric layer located on top of a bulk substrate layer;
    forming a mask on top of the epitaxial layer, the mask defining where a piezo-resistor and insulator structure are to be located by creating first exposed portions of the epitaxial layer; and
    growing a silicon dioxide layer ($SiO_2$) in a Local Oxidation of Silicon (LOCOS) process for a predetermined time on the first exposed portions of the epitaxial layer based on a thickness value of the piezo-resistor, the piezo-resistor being located below the $SiO_2$ layer.

2. The method of claim 1, further comprising determining a leadout resistance electrically coupled to the piezo-resistor by establishing a thickness of the epitaxial layer.

3. The method of claim 1, wherein the epitaxial layer is n-type silicon, the n-type silicon having a dopant concentration that establishes a resistivity value of the piezo-resistor.

4. The method of claim 1, wherein the bulk substrate layer comprises a cavity located below the piezo-resistor, wherein a diaphragm formed by the cavity allows the overall resistance of the piezo-resistor to be varied with applied pressure.

5. The method of claim 1, wherein the mask layer is silicon nitride ($Si_3N_4$).

6. The method of claim 1, wherein the dielectric layer is $SiO_2$.

7. The method of claim 1, wherein forming the mask layer comprises:
   depositing a mask layer on top of the epitaxial layer,
   depositing a photoresist layer on top of the mask layer;
   defining the first exposed portions of the epitaxial layer in exposed areas of the photoresist layer in a photolithographic process; and
   etching the mask layer in the exposed areas of the photoresist layer so as to form the mask.

8. The method of claim 1, further comprising:
   removing the mask layer to create second exposed portions of the epitaxial layer;
   implanting a first dopant species into the second exposed portions of the epitaxial layer; and
   creating a leadout resistance to the piezo-resistor by diffusing the first dopant species, the first dopant species being driven to the dielectric layer, the density of the first dopant species in the epitaxial layer establishing a resistance value of the leadout resistance.

9. The method of claim 8, further comprising removing the $SiO_2$ layer in a chemical etching process.

10. The method of claim 8, further comprising:
    implanting a second dopant species into the first exposed portions of the epitaxial layer; and
    driving the second dopant species to the dielectric layer, the density of the second dopant species in the epitaxial layer establishing a resistance value of the piezo-resistor.

11. The method of claim 10, further comprising a predetermined time to establish the thickness of the piezo-resistor.

12. A method of establishing the overall resistance of a piezo-resistive sensor with leadout interconnects, the method comprising:
    determining a first resistivity value of a leadout resistor, the leadout resistor comprising a silicon layer, and the leadout resistor providing an electrical coupling to a piezo-resistor;
    depositing a mask on top of the silicon layer, the mask defining the location of the piezo-resistor and the leadout resistor; and
    determining a second resistivity value of the piezo-resistive by growing an oxide in an un-masked region of the silicon layer in a Local Oxidation of Silicon (LOCOS) process for a predetermined time, the predetermined time establishing a thickness of the piezo-resistor and thereby the second resistivity value.

13. The method as in claim 12, further comprising:
    removing the mask; and
    implanting a first doping species into a previously masked region of the silicon layer.

14. The method as in claim 13, further comprising:
    removing the oxide; and
    implanting a second doping species into the un-masked region of the silicon layer.

15. The method as in claim 14, further comprising driving the first and second doping species to a buried oxide layer, the buried oxide layer being located below the silicon layer.

* * * * *

UNITED STATES PATENT AND TRADEMARK OFFICE
CERTIFICATE OF CORRECTION

PATENT NO.        : 7,381,582 B2
APPLICATION NO. : 11/263464
DATED             : June 3, 2008
INVENTOR(S)       : Russell L. Johnson and Curtis H. Rahn It is certified that error appears in the above-identified patent and that said Letters Patent is hereby corrected as shown below:

In Column 2, line 13, replace "piezo-resistive" with "piezo-resistor"

Signed and Sealed this

Thirteenth Day of January, 2009

JON W. DUDAS
*Director of the United States Patent and Trademark Office*